United States Patent
Chen et al.

(10) Patent No.: US 9,652,081 B2
(45) Date of Patent: May 16, 2017

(54) OPTICAL TOUCH SYSTEM, METHOD OF TOUCH DETECTION, AND COMPUTER PROGRAM PRODUCT

(71) Applicant: Wistron Corporation, New Taipei (TW)

(72) Inventors: Shih-Wen Chen, New Taipei (TW); Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 282 days.

(21) Appl. No.: 14/183,547

(22) Filed: Feb. 19, 2014

(65) Prior Publication Data
US 2015/0109258 A1    Apr. 23, 2015

(30) Foreign Application Priority Data
Oct. 22, 2013    (TW) .............................. 102138142 A

(51) Int. Cl.
*G06F 3/042*    (2006.01)
*G06F 3/0354*    (2013.01)

(52) U.S. Cl.
CPC .......... *G06F 3/0421* (2013.01); *G06F 3/0428* (2013.01); *G06F 3/03545* (2013.01); *G06F 2203/04104* (2013.01)

(58) Field of Classification Search
CPC ...... G06F 3/0414; G06F 3/042; G06F 3/0386; G06F 3/03545

(Continued)

(56) References Cited

U.S. PATENT DOCUMENTS 6,667,765 B1 *    12/2003    Tanaka ................. H04N 5/2353
                                                             348/229.1
7,176,904 B2 *    2/2007    Satoh .................. G06F 3/04883
                                                              178/18.01

(Continued)

FOREIGN PATENT DOCUMENTS

TW    201001146    1/2010
TW    201037579    10/2010

OTHER PUBLICATIONS

"Office Action of Taiwan Counterpart Application" with partial English translation, issued on Oct. 13, 2015, p. 1-p. 19, in which the listed references were cited.

(Continued)

*Primary Examiner* — Chanh Nguyen
*Assistant Examiner* — Yuzhen Shen
(74) *Attorney, Agent, or Firm* — Jianq Chyun IP Office

(57) ABSTRACT

An optical touch system is provided. A reflector is disposed beside a base plane. At least one light source is disposed beside the base plane and provides a detecting light, wherein the detecting light is transmitted to the reflector. At least one optical detecting sensor is disposed beside the base plane. A processor is coupled to the optical detecting sensor, wherein when a first object and a second object approach or touch the base plane, the processor determines which one of the intensity of a first portion of a signal corresponding to the first object OB1 and the intensity of a second portion of the signal corresponding to the second object OB2 from the optical detecting sensor is larger. Additionally, a method of touch detection and a computer program product are also provided.

18 Claims, 9 Drawing Sheets

(58) Field of Classification Search
USPC .......................................... 345/173, 175, 179
See application file for complete search history.

(56) References Cited

U.S. PATENT DOCUMENTS

| | | | | |
|---|---|---|---|---|
| 7,538,894 | B2 * | 5/2009 | Kobayashi | G06F 3/0416 |
| | | | | 345/175 |
| 8,525,814 | B2 | 9/2013 | Hsiao et al. | |
| 2009/0295755 | A1 * | 12/2009 | Chapman | G06F 3/0428 |
| | | | | 345/175 |
| 2011/0109565 | A1 * | 5/2011 | Zhu | G06F 3/0416 |
| | | | | 345/173 |
| 2012/0212639 | A1 | 8/2012 | Gu et al. | |
| 2013/0162877 | A1 * | 6/2013 | Wang | G06F 3/0416 |
| | | | | 348/333.01 |
| 2013/0241883 | A1 * | 9/2013 | Leung | G06F 3/0425 |
| | | | | 345/175 |

OTHER PUBLICATIONS

"Office Action of China Counterpart Application" with English translation thereof, issued on Jan. 26, 2017, p. 1-p. 12.

* cited by examiner

OPTICAL TOUCH SYSTEM, METHOD OF TOUCH DETECTION, AND COMPUTER PROGRAM PRODUCT

CROSS-REFERENCE TO RELATED APPLICATION

This application claims the priority benefit of Taiwan application serial no. 102138142, filed on Oct. 22, 2013. The entirety of the above-mentioned patent application is hereby incorporated by reference herein and made a part of this specification.

BACKGROUND OF THE DISCLOSURE

Field of the Disclosure

The disclosure relates to an optical touch system, a method of touch detection, and a computer program product.

Description of Related Art

Recently, touch electronic products have become very popular among consumers due to the easy operation and high intuition thereof, and have gradually become mainstream in the market. Among the resistive, capacitive, and rear projection touch screens used in the past, the capacitive touch screen has the best touch effect; however, the capacitive touch screen is also the most expensive, and the cost thereof increases with larger screen size, thereby limiting the application of the capacitive touch screen.

To find an alternative to the capacitive touch screen, an optical touch screen using an optical lens to detect a touch location is currently available. The optical touch screen has the advantages of low cost and good accuracy, and is more advantageous in the competitive market. As a result, the optical touch screen has currently also become an alternative for a large-size touch screen.

Another optical touch screen uses a plurality of optical lenses or a reflective frame at the border of the screen to capture an image of the operation of a user's finger on the screen, and to analyze the location of a shadow in the captured image generated due to the finger blocking light. As a result, the exact location of the touch point can be determined. In particular, the cost of disposing a reflective frame is far less than the cost of disposing a plurality of optical lenses. Therefore, the optical touch screen using a reflective frame has a price advantage. Generally, when detecting two touch points, a set of true touch points and a set of false touch points are generated. If two touch points approach a touch region at different time points, then the true touch points can be determined without additional hardware. However, determining which set contains the true touch points when two touch points approach the touch region at the same time is a current issue that needs to be solved in the development of an optical touch system.

SUMMARY OF THE DISCLOSURE

The disclosure provides an optical touch system capable of accurately determining the action of at least one of a first object and a second object approaching or touching a base plane.

The method of touch detection of the disclosure is capable of accurately determining the action of at least one of a first object and a second object approaching or touching a base plane.

The computer program product of the disclosure is capable of accurately determining the action of at least one of a first object and a second object approaching or touching a base plane.

An embodiment of the disclosure provides an optical touch system for determining the action of at least one of a first object and a second object approaching or touching a base plane. The optical touch system includes a reflector, at least one light source, at least one optical detecting sensor, and a processor. The reflector is disposed beside the base plane. The at least one light source is disposed beside the base plane and provides a detecting light, wherein the detecting light is transmitted to the reflector via the front of the base plane. The at least one optical detecting sensor is disposed beside the base plane, wherein the reflector reflects the detecting light and transmits the detecting light to a first optical detecting sensor via the front of the base plane. The processor is coupled to the optical detecting sensor, wherein when at least one of the first object and the second object approaches or touches the base plane, the processor determines the location of the base plane that is approached or touched according to a signal corresponding to the detecting light. Moreover, when the first object and the second object approach or touch the base plane, the processor determines which one of the intensity of a first portion of the signal corresponding to the first object and the intensity of a second portion of the signal corresponding to the second object is larger.

An embodiment of the disclosure provides a method of touch detection for determining the action of at least one of a first object and a second object approaching or touching a base plane. The method of touch detection includes: providing at least one detecting light and transmitting the detecting light via the front of the base plane; reflecting the detecting light on one side of the base plane; detecting the reflected at least one detecting light and converting the at least one detecting light into at least one corresponding signal; when at least one of the first object and the second object approaches or touches the base plane, determining the location of the base plane that is approached or touched according to the signal corresponding to the detecting light; and when the first object and the second object approach or touch the base plane, determining which one of the intensity of a first portion of the signal corresponding to the first object and the intensity of a second portion of the signal corresponding to the second object is larger.

An embodiment of the disclosure provides a computer program product stored in a computer-readable recording medium for determining the action of at least one of a first object and a second object approaching or touching a base plane. The computer program product includes first instructions, second instructions, third instructions, and fourth instructions. The first instructions provide at least one detecting light, wherein the detecting light is transmitted via the front of the base plane. The second instructions detect the reflected detecting light and convert the detecting light into a corresponding signal. The third instructions determine, when at least one of the first object and the second object approaches or touches the base plane, the location of the base plane that is approached or touched according to the signal corresponding to the detecting light. The fourth instructions determine, when the first object and the second object approach or touch the base plane, which one of the intensity of a first portion of the signal corresponding to the first object and the intensity of a second portion of the signal corresponding to the second object is larger.

Based on the above, the optical touch system, the method of touch detection, and the computer program product of the embodiments of the disclosure determine, when at least one of a first object and a second object approaches or touches a base plane, which one of the intensity of a first portion of a signal corresponding to the first object and the intensity of a second portion of the signal corresponding to the second object detected by an optical detecting sensor is larger. Therefore, the location of the base plane that is approached or touched can be accurately determined.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
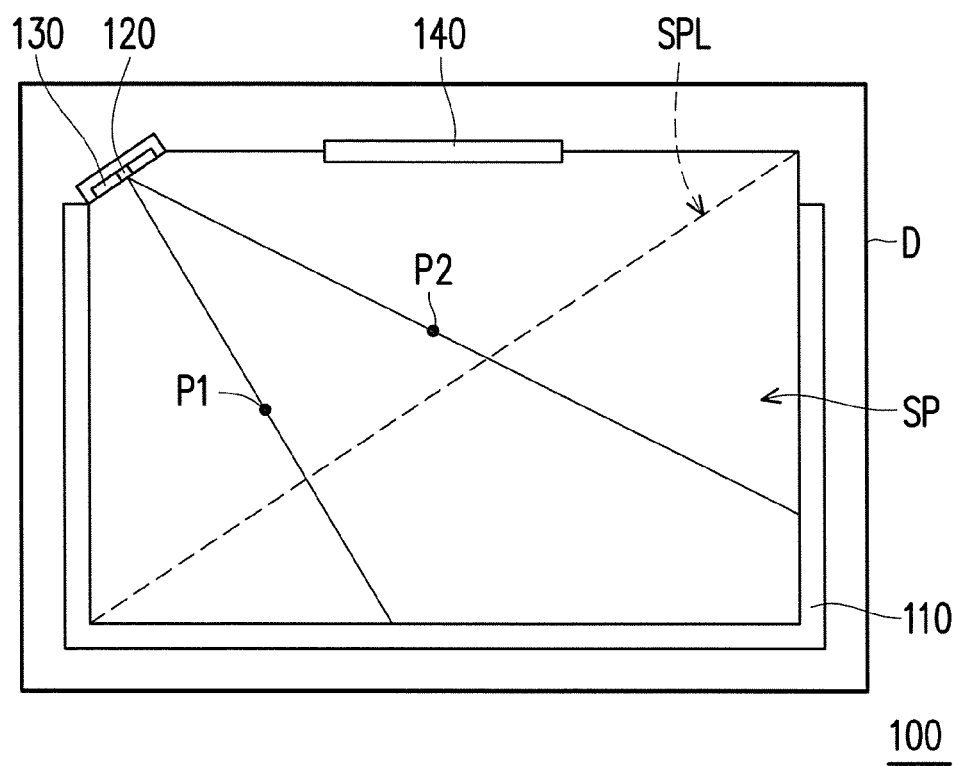
FIG. 1 is a schematic diagram of an optical touch system according to an embodiment of the disclosure.

FIG. 1 is a schematic diagram of an optical touch system according to an embodiment of the disclosure. Referring to FIG. 1, an optical touch system 100 of the present embodiment can be used to determine the action of at least one of a first object OB1 and a second object OB2 approaching or touching a base plane SP. In the present embodiment, the optical touch system 100 can be applied in a display D. In particular, the base plane SP is the display surface of the display D. Alternatively, in other embodiments, the base plane SP can also be a surface of a touch platform different from the display D. In particular, the touch panel is, for instance, a touchpad (such as a touchpad on the keyboard of a notebook computer or a touchpad on other handheld electronic devices), a desktop, a wall, or other surfaces capable of being approached or touched by a first object OB1 and a second object OB2. The first object OB1 and the second object OB2 are, for instance, a user's finger, a stylus pen, or other objects suitable for touch operation.

In the present embodiment, the optical touch system 100 includes a reflector 110, at least one light source 120 (one light source 120 is shown in FIG. 1 as an example), at least one optical detecting sensor 130 (one optical detecting sensor 130 is shown in FIG. 1 as an example), and a processor 140. The reflector 110 is disposed beside the base plane SP. In the present embodiment, the reflector 110 is a reflective frame as illustrated in FIG. 1, and the light source 120 can include a light source suitable for emitting a detecting light, such as a light emitting diode (LED) or a laser. The image detecting module can include an image sensor such as a charge couple device (CCD) or a complementary metal-oxide semiconductor (CMOS) sensor.

Referring further to FIG. 1, in the present embodiment, the light source 120 is disposed beside the base plane SP and provides a detecting light L. In particular, the detecting light L is transmitted to the reflector 110 via the front of the base plane SP. The optical detecting sensor 130 is disposed beside the base plane SP. In particular, the reflector 110 reflects the detecting light L and transmits the detecting light L to the optical detecting sensor 130 via the front of the base plane SP. Moreover, the processor 140 is coupled to the optical detecting sensor 130.

Referring further to FIG. 1, in the present embodiment, when at least one of the first object OB1 and the second object OB2 approaches or touches the base plane SP, the processor 140 determines the location of the base plane SP that is approached or touched according to a signal corresponding to the detecting light L from the optical detecting sensor 130. Moreover, when the first object OB1 and the second object OB2 approach or touch the base plane SP, the processor 140 determines which one of the intensity of a first portion of the signal corresponding to the first object OB1 and the intensity of a second portion of the signal corresponding to the second object OB2 is larger. In particular, the signal corresponding to the detecting light L is described later with illustrations.

Figure 2A:
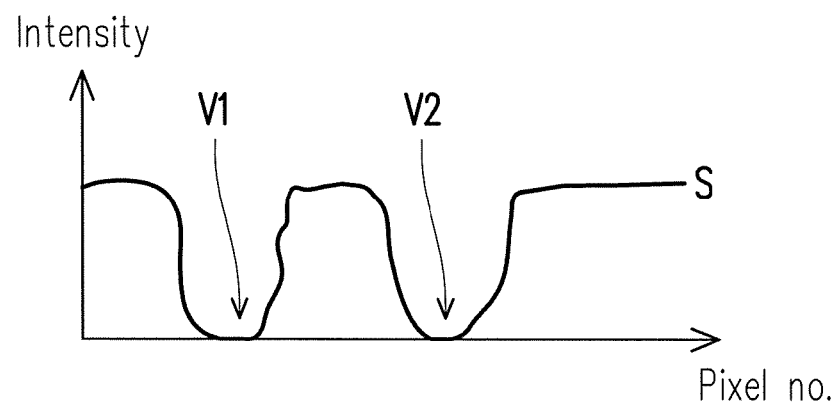
FIG. 2A to FIG. 2B are schematic diagrams of a signal detected by an optical detecting sensor according to the embodiment of FIG. 1.
Figure 2B:
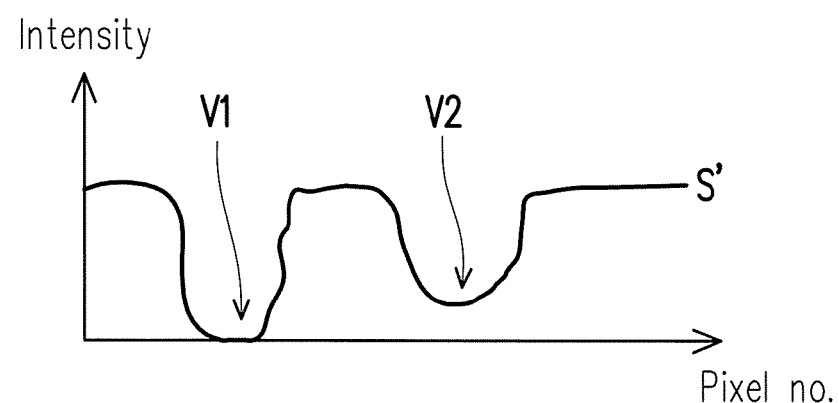

FIG. 2A to FIG. 2B are schematic diagrams of a signal detected by an optical detecting sensor according to the embodiment of FIG. 1. Referring to FIG. 1, FIG. 2A, and FIG. 2B, in the present embodiment, when the first object OB1 and the second object OB2 block at least a portion of the detecting light L, the optical detecting sensor 130 can generate a signal S corresponding to the detecting light L. In particular, the horizontal axis of FIG. 2 is the detection angles of the image detecting module 130, and the range of each of the detection angles can cover the base plane SP along the direction of a reference line SPL. The vertical axis is the intensity of the signal detected by the optical detecting sensor 130, and the intensity of the signal detected by the optical detecting sensor 130 corresponds to the intensity of light detected by the optical detecting sensor 130. In the present embodiment, when the first object OB1 and the second object OB2 approach or touch the base plane SP, the processor 140 can determine the locations of the base plane SP that are approached or touched according to the signal S corresponding to the detecting light L. In particular, when the difference between an intensity V1 of a first portion of the signal S corresponding to the detecting light L and corresponding to the first object OB1 and an intensity V2 of a second portion of the signal S corresponding to the detecting light L and corresponding to the second object OB2 does not exceed a predetermined extent, the processor 140 increases the length of exposure time of the optical detecting sensor 130 such that the difference between the intensity V1 of the first portion and the intensity V2 of the second portion exceeds the predetermined extent.

Specifically, in the present embodiment, the intensity V1 of the first portion of the signal corresponding to the detecting light L and corresponding to the first object OB1 and the intensity V2 of the second portion of the signal corresponding to the detecting light L and corresponding to the second object OB2 are both zero as shown in FIG. 2A. Moreover, at this point, the difference between the intensity V1 of the first portion of the signal S corresponding to the detecting light L and corresponding to the first object OB1 and the intensity V2 of the second portion of the signal S corresponding to the detecting light L and corresponding to the second object OB2 does not exceed the predetermined extent, and therefore the processor 140 increases the length of exposure time of the optical detecting sensor 130 and adds a fixed length of time. The optical detecting sensor 130 generates another signal S' (not shown) corresponding to the detecting light L. However, when the difference between the intensity V1 of the first portion and the intensity V2 of the second portion still does not exceed the predetermined extent, the processor 140 increases the length of exposure time of the optical detecting sensor 130 again until the difference between the intensity V1 of the first portion and the intensity V2 of the second portion exceeds the predetermined extent as shown in FIG. 2B. In other embodiments, when the processor 140 increases the length of exposure time of the optical detecting sensor 130, the processor 140 adds a fixed length of time, and the optical detecting sensor 130 generates another signal S" corresponding to the detecting light L until the difference between the intensity V1 of the first portion and the intensity V2 of the second portion exceeds the predetermined extent. For instance, "exceeding a predetermined extent" can be defined as the difference between a grey value of the intensity V1 of the first portion and the grey value of the intensity V2 of the second portion is larger than 1, preferably larger than 2. In an embodiment, it can also be determined if the grey value of one of the intensity V1 and the intensity V2 is larger than 0 (preferably larger than 2), and if the other grey value of the intensity V1 and the intensity V2 is 0.

Generally, the processor 140 determines which one of the distance from the first object OB1 to the optical detecting sensor 130 and the distance from the second object OB2 to the optical detecting sensor 130 is larger by determining which one of the intensity V1 of the first portion of the signal corresponding to the first object OB1 and the intensity V2 of the second portion of the signal corresponding to the second object OB2 is larger. In the present embodiment, the processor 140 determines the distance from the location that is approached or touched corresponding to the larger one of the intensity V1 of the first portion and the intensity V2 of the second portion to the optical detecting sensor 130 is longer than the distance from the location that is approached or touched corresponding to the smaller one of the intensity V1 of the first portion and the intensity V2 of the second portion to the optical detecting sensor 130. This is because a longer exposure time readily makes a blocking signal corresponding to a farther location insignificant when the location touched or approached is farther.

Specifically, in the present embodiment, the intensity V2 of the second portion is larger, and therefore the distance from the location approached or touched corresponding to the intensity V2 of the second portion to the optical detecting sensor 130 is longer than the distance from the location approached or touched corresponding to the intensity V1 of the first portion to the optical detecting sensor 130. As a result, the processor 140 can determine which one of the distances from the first object OB1 to the second object OB2 is larger.

Figure 3:
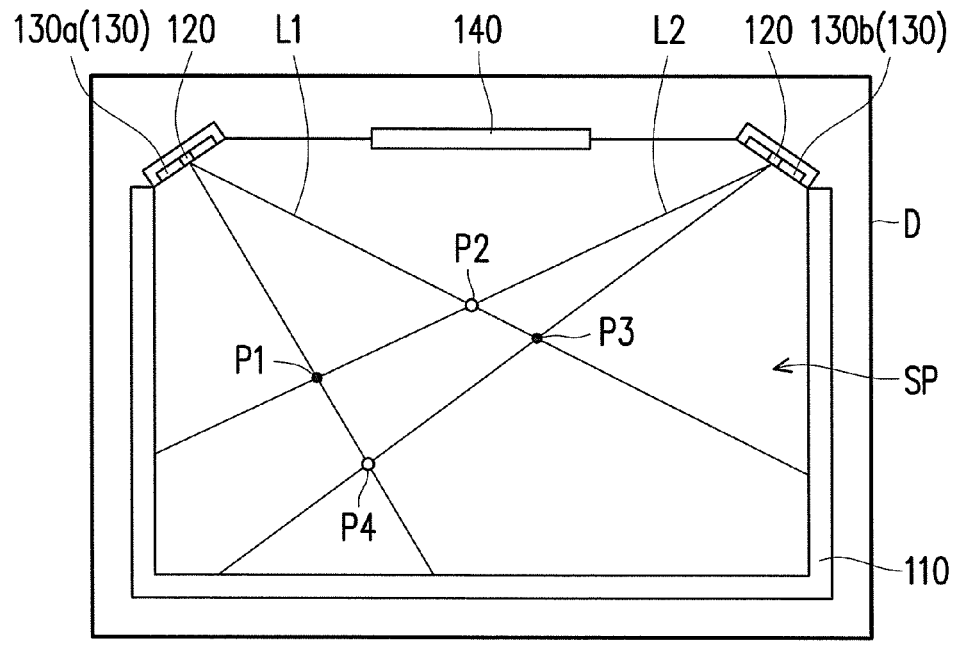
FIG. 3 is a schematic diagram of an optical touch system according to another embodiment of the disclosure.
Figure 4:
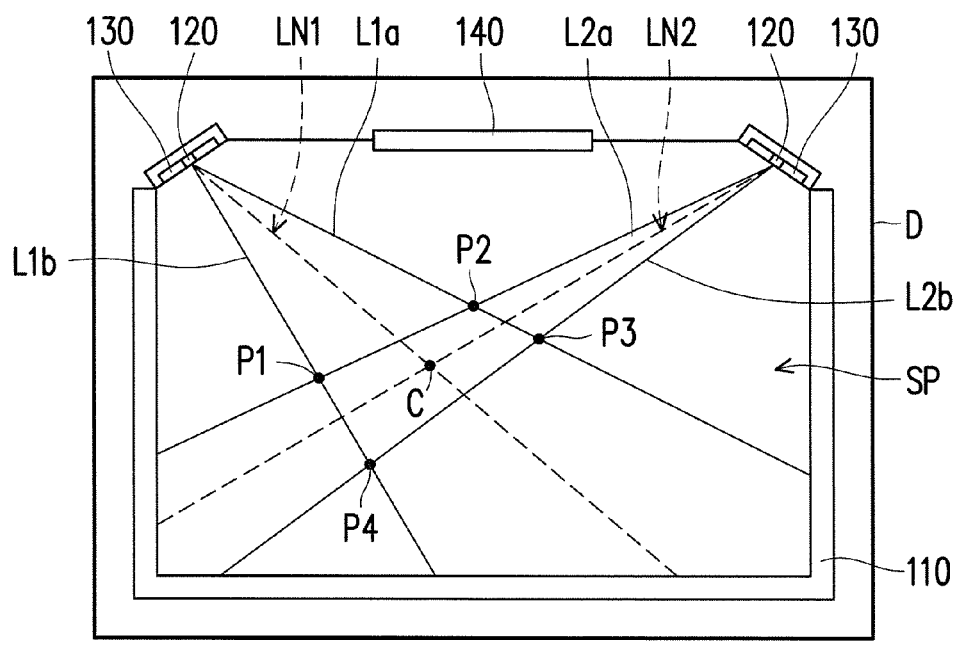
FIG. 4 is a schematic diagram of an optical touch system according to the embodiment of FIG. 3.

FIG. 3 is a schematic diagram of an optical touch system according to another embodiment of the disclosure. FIG. 4 is a schematic diagram of an optical touch system according to the embodiment of FIG. 3. FIG. 5A to FIG. 5D are schematic diagrams of a signal detected by an optical detecting unit. Referring to FIG. 3, the optical touch system 200 of the present embodiment is similar to the optical touch system 100 of FIG. 1, and the difference between the two is as described below. In the present embodiment, the at least one light source 120 is two light sources 120 disposed at different locations beside the base plane SP, one of the two light sources 120 provides a detecting light L1, and the other one of the two light sources 120 provides a detecting light L2. A plurality of optical detecting sensors 130 is disposed at different locations beside the base plane SP, and the plurality of optical detecting sensors 130 is, for instance, a first optical detecting sensor 130a and a second optical detecting sensor 130b. The processor 140 determines which one of the intensity V1 of a first portion and the intensity V2 of a second portion of the signal of at least one of the first optical detecting sensor 130a and the second optical detecting sensor 130b is larger, so as to select actual locations approached or touched by the first object OB1 and the second object OB2 from the possible locations.

Figure 5A:
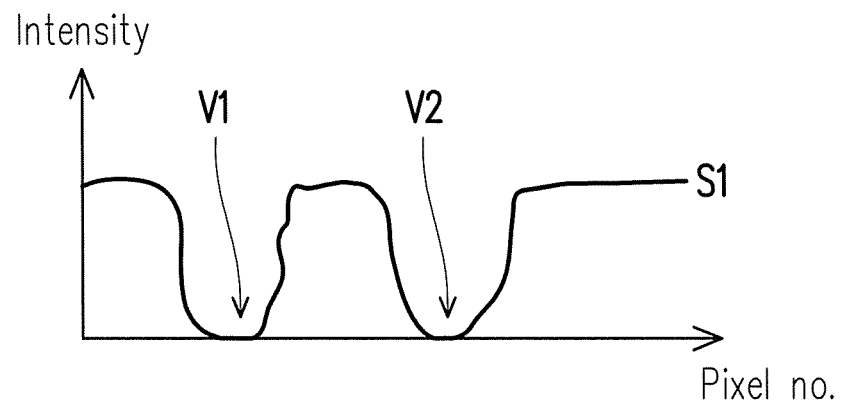
FIG. 5A to FIG. 5D are schematic diagrams of a signal detected by an optical detecting sensor.
Figure 5B:
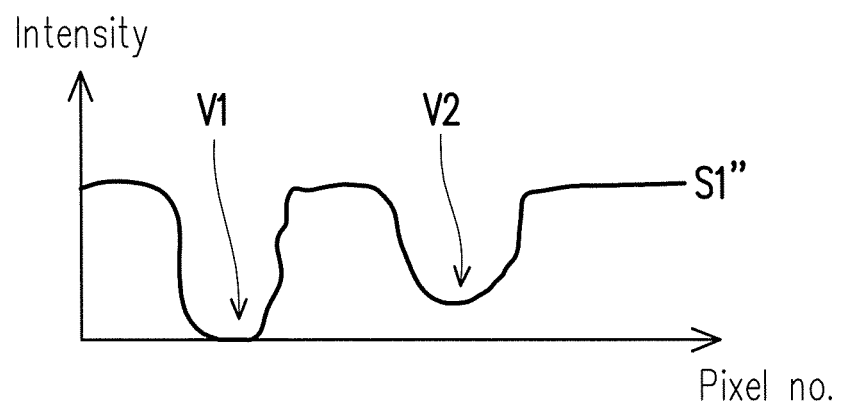
Figure 5C:
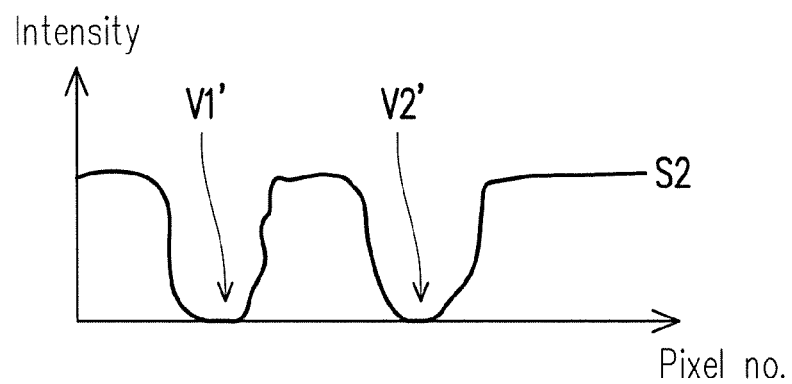
Figure 5D:
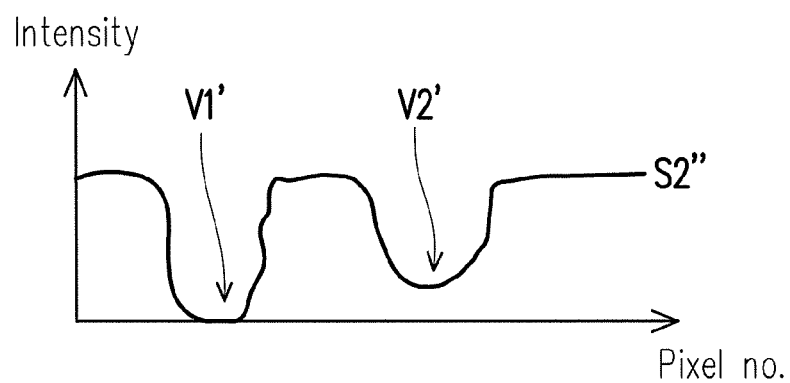

Referring to FIG. 3, FIG. 5A, and FIG. 5C, specifically, when the first object OB1 and the second object OB2 approach or touch the base plane SP, the first optical detecting sensor 130a generates a signal S1 corresponding to the detecting light L1 and another one of the second optical detecting sensor 130b generates a signal S2 corresponding to the detecting light L2. Then, when a portion of the signal S1 of the first optical detecting sensor 130a is less than a default intensity, the intensity of a portion of the signal S1 is the intensity V1 of the first portion and the intensity of the other portion of the signal is the intensity V2 of the second portion. When a portion of the signal S2 of the second optical detecting sensor 130b is less than the default intensity, the intensity of a portion of the signal S2 is the intensity V1' of the first portion and the intensity of the other portion of the signal S2' is the intensity V2' of the second portion. Moreover, in the present embodiment, the default intensity is a multiple of the intensity of the signal detected by the optical detecting sensor 130 when neither of first object OB1 and the second object OB2 approaches or touches the base plane SP. In other embodiments, the default intensity can be obtained through different methods, and the different methods include, for instance, an experiment or a simulation, but the disclosure is not limited thereto.

Referring further to FIG. 3, the processor 140 uses triangulation to calculate a plurality of possible locations approached or touched by the first object OB1 and the second object OB2 according to the signal S of the optical detecting sensor 130. Specifically, in the present embodiment, the processor 140 uses triangulation to calculate a plurality of possible locations approached or touched by the first object OB1 and the second object OB2 according to the signal S1 of the first optical detecting sensor 130a and the signal S2 of the second optical detecting sensor 130b. Moreover, the plurality of possible locations approached or touched by the first object OB1 and the second object OB2 are, for instance, locations P1, P2, P3, and P4. One of the locations P1, P2, P3, and P4 corresponds to a location of the first object OB1 relative to the base plane SP, and another one of the locations P1, P2, P3, and P4 corresponds to a location of the second object OB2 relative to the base plane SP.

Referring to FIG. 3 and FIG. 4, the processor 140 calculates a location C of geometric center of the possible locations and decides the length of initial exposure time of at least one of the optical detecting sensors 130 according to the location C of geometric center. Specifically, in the present embodiment, the processor 140 calculates the location C of geometric center of the plurality of possible locations P1, P2, P3, and P4 approached or touched by the first object OB1 and the second object OB2. In other embodiments, the processor 140 can also calculate the point of intersection of a bisector LN1 and a bisector LN2 according to the bisector LN1 of a ray L1a and a ray L1b in the detecting light L1 provided by one of the two light sources 120 and a bisector LN2 of a ray L2a and a ray L2b in the detecting light L2 provided by the other one of the two light sources 120. The point of intersection is also the location C of geometric center of the plurality of possible locations P1, P2, P3, and P4 approached or touched by the first object OB1 and the second object OB2. Next, the processor 140 can find the length of initial exposure time of at least one of the optical detecting sensors 130 according to the location C of geometric center through a table look up method.

Referring to FIG. 5A and FIG. 5B, the length of exposure time of at least one of the first optical detecting sensor 130a and the second detecting module 130b is the length of initial exposure time, such that the intensity V1 (V1') of the first portion and the intensity V2 (V2') of the second portion of the signal of at least one of the first optical detecting sensor 130a and the second optical detecting sensor 130b corresponding to each other exceed zero. In other embodiments, the length of exposure time of at least one of the first optical detecting sensor 130a and the second optical detecting sensor 130b is the length of initial exposure time, such that the intensity V1 (V1') of the first portion and the intensity V2 (V2') of the second portion of the signal of at least one of the first optical detecting sensor 130a and the second optical detecting sensor 130b corresponding to each other exceed two. At this point, if the difference between the intensity V1 of the first portion and the intensity V2 of the second portion of at least one of the first optical detecting sensor 130a and the second optical detecting sensor 130b corresponding to each other does not exceed a predetermined extent as shown in FIG. 5A, then the processor 140 increases the length of exposure time of at least one of the first optical detecting sensor 130a and the second optical detecting sensor 130b and adds a fixed length of time. Moreover, at least one of the first optical detecting sensor 130a and the second optical detecting sensor 130b corresponding to each other generates another signal S' (not shown) corresponding to the detecting light L. However, when the difference between the intensity V1 (V1') of the first portion and the intensity V2 (V2') of the second portion still does not exceed the predetermined extent, then the processor 140 increases the length of exposure time of the optical detecting sensor 130 again until the difference between the intensity V1 (V1') of the first portion and the intensity V2 (V2') of the second portion exceeds the predetermined extent as shown in FIG. 5B, such that the difference between the intensity V1 (V1') of the first portion and the intensity V2 (V2') of the second portion of the signal S" exceeds the predetermined extent. Then, the processor 140 determines the distance from the location that is approached or touched corresponding to the larger one of the intensity V1 (V1') of the first portion and the intensity V2 (V2') of the second portion of the signal S" to the optical detecting unit 130 is longer than the distance from the location that is approached or touched corresponding to the smaller one of the intensity V1 (V1') of the first portion and the intensity V2 (V2') of the second portion to the optical detecting sensor 130.

Referring to FIG. 5A to FIG. 5D, in the present embodiment, the first optical detecting sensor 130a can make the difference between the intensity V1 of the first portion and the intensity V2 of the second portion of the signal S1" exceed the predetermined extent through the above process. Moreover, the second optical detecting sensor 130b can make the difference between the intensity V1 of the first portion and the intensity V2 of the second portion of the signal S2" exceed the predetermined extent through the above process. More specifically, the processor 140 determines the distance from the location that is approached or touched corresponding to the larger one of the intensity V1 of the first portion and the intensity V2 of the second portion of the signal S1" of the first optical detecting sensor 130a to the first optical detecting sensor 130a is longer, and the distance from the location that is approached or touched corresponding to the smaller one of the intensity V1' of the first portion and the intensity V2' of the second portion of the signal S2" of the second optical detecting sensor 130b to the second optical detecting sensor 130b is shorter. In this way, the location corresponding to each of the first object OB1 and the second object OB2 relative to the base plane SP can be obtained from a plurality of possible locations (in the present embodiment, for instance, locations P1, P2, P3, and P4) approached or touched by the first object OB1 and the second object OB2. For instance, when the processor 140 determines the distance from the first object OB1 to the first optical detecting sensor 130a is shorter, and the distance from the second object OB2 to the first optical detecting sensor 130a is longer, the processor 140 can determine the first object OB1 and the second object OB2 are respectively located at locations P1 and P3 and not located at locations P2 and P4. This is because when the first object OB1 and the second object OB2 are respectively located at locations P2 and P4, the processor 140 determines the distance from the first object OB1 to the first optical detecting sensor 130a is longer, and the distance from the second object OB2 to the first optical detecting sensor 130a is shorter. Through the method, the processor 140 can select the actual locations that are approached or touched from all of the possible locations.

Moreover, in the present embodiment, after the processor 140 determines the actual locations approached or touched by the first object OB1 and the second object OB2, the processor 140 returns the exposure time of each of the optical detecting sensors 130 to a default value.

Figure 6:
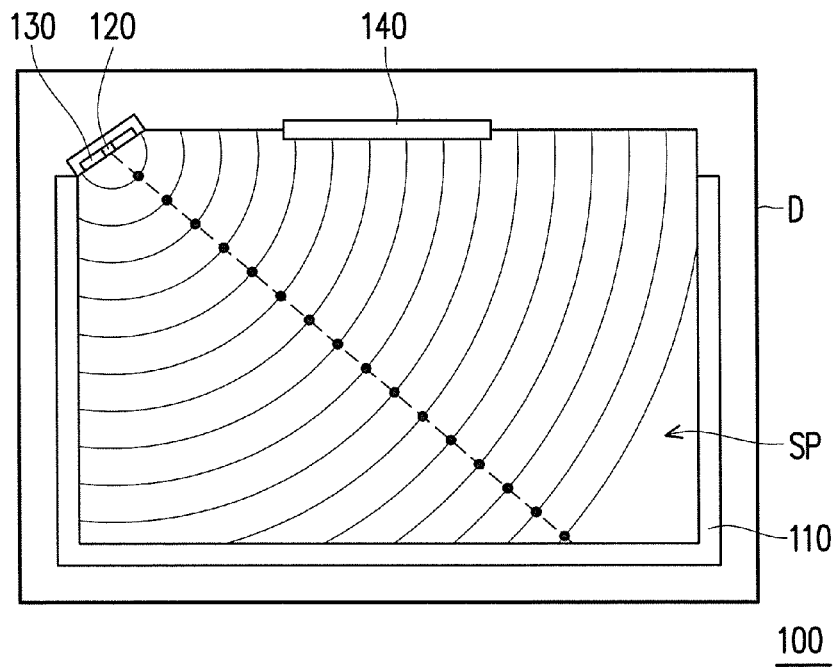
FIG. 6 is a schematic diagram of an experiment measuring different distances and the corresponding minimum exposure times required.
Figure 7:
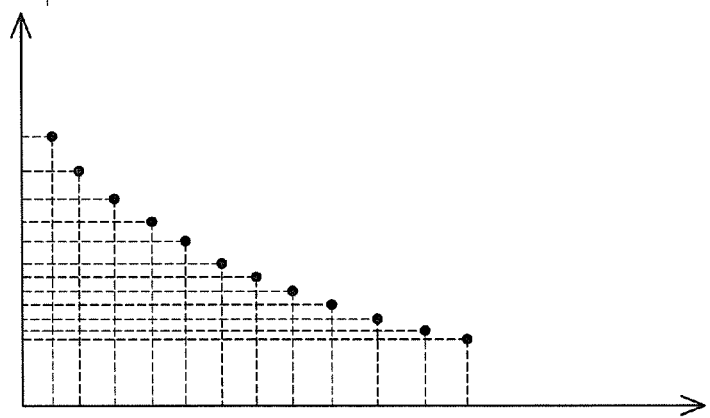
FIG. 7 is a data map of different distances and the corresponding minimum exposure times required.

FIG. 6 is a schematic diagram of an experiment measuring different distances and the corresponding minimum exposure times required. FIG. 7 is a data map of different distances and the corresponding minimum exposure times required. Referring to FIG. 6, in the present embodiment, the data in the table used in the table look up method is obtained through experiments, and each of the experiments includes approaching or touching a plurality of locations of the base plane SP with the object OB. The plurality of locations are, for instance, location a to location j, and the distances between location a to location j and the optical detecting sensor 130 are arranged from short to long and are different from each other. For instance, the experiments can include approaching or touching location a of the base plane SP with the object OB to measure the distance between location a and the optical detecting sensor 130. Then, the length of exposure time of the optical detecting sensor 130 is set to the length of minimum exposure time corresponding to this distance, and the intensity V' of a portion of the signal S corresponding to the object OB detected by the optical detecting sensor 130 is measured. If the intensity V' is zero, then the length of exposure time of the optical detecting sensor 130 is increased by a fixed length of time. In particular, the fixed length of time is, for instance, 1 millisecond. If the intensity V' exceeds zero, then the length of exposure time at this point is the length of minimum exposure time required to make the intensity V' exceed zero in the particular distance. The data in the table contains the distance between each of location a to location j and the optical detecting sensor 130, and the length of minimum exposure time corresponding to each of the distances required to make the intensity V' exceed zero. In other embodiments, the data in the table contains the distance between each of location a to location j and the optical detecting sensor 130, and the length of minimum exposure time corresponding to each of the distances required to make the intensity V' exceed 2.

Referring to FIG. 6 and FIG. 7, in the present embodiment, after the table containing the distance between each of location a to location j and the optical detecting sensor 130 and the length of minimum exposure time corresponding to each of the distances required to make the intensity V' exceed 2 is obtained through experiments, the data of the distance between each of location a to location j and the optical detecting sensor 130 and the length of minimum exposure time corresponding to each of the distances required to make the intensity V' exceed zero can be obtained through interpolation, as shown in FIG. 7. Alternately, the number of measurement locations can be increased instead of using interpolation.

It should be mentioned that, the number of location a to location j, the location, and the distance of the object OB are only used to exemplarily describe the present embodiment. In particular, the object OB can further be placed at other locations on the base plane SP and the number of the object OB can also be adjusted. Moreover, the distance between the objects OB can also be adjusted according to the actual requirement, and the disclosure is not limited thereto.

Figure 8:
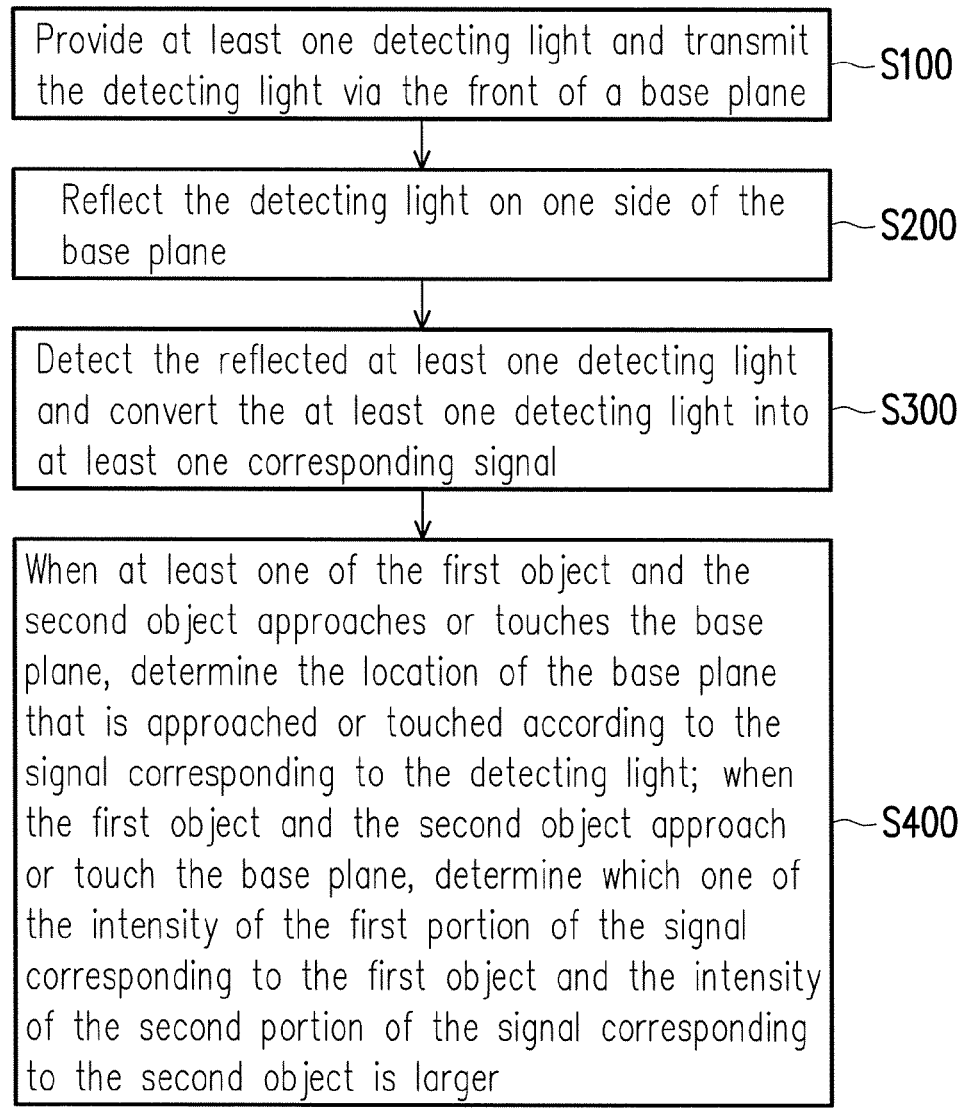
FIG. 8 is a flow chart of a method of touch detection according to an embodiment of the disclosure.

FIG. 8 is a flow chart of a method of touch detection according to an embodiment of the disclosure. Referring to FIG. 8, in the present embodiment, the method of touch detection can be applied in the optical touch system 100 or 200 above. The method of touch detection of the present embodiment can be used to determine the action of at least one of the first object OB1 and the second object OB2 approaching or touching the base plane SP. In particular, the system used to execute the method of touch detection is similar to the optical detecting system of FIG. 1 to FIG. 7, and the method of touch detection includes the following steps: at least one detecting light L is provided, and the detecting light L is transmitted via the front of the base plane SP (step S100). The detecting light L is reflected on one side of the base plane SP (step S200). The reflected at least one detecting light L is detected and the at least one detecting light L is converted into at least one corresponding signal (step S300). When at least one of the first object OB1 and the second object OB2 approaches or touches the base plane SP, the location of the base plane SP that is approached or touched is determined according to a signal corresponding to the detecting light L (step S400), and when the first object OB1 and the second object OB2 approach or touch the base plane SP, which one of the intensity V1 of a first portion of the signal corresponding to the first object OB1 and the intensity V2 of a second portion of the signal corresponding to the second object OB2 is larger is determined. Similarly to the embodiments of FIG. 1 to FIG. 7, the method of touch detection determines, when at least one of a first object OB1 and a second object OB2 approaches or touches a base plane, the location of the base plane that is approached or touched by determining which one of the intensity of the first portion of the signal corresponding to the first object OB1 and the intensity of the second portion of the signal corresponding to the second object OB2 detected by an optical detecting sensor is larger.

Specifically, the step of determining which one of the intensity V1 of the first portion of the signal corresponding to the first object OB1 and the intensity V2 of the second portion of the signal corresponding to the second object OB2 is larger includes: determining, when the difference between the intensity V1 of the first portion and the intensity V2 of the second portion exceeds a predetermined extent, the distance from the location that is approached or touched corresponding to the larger one of the intensity V1 of the first portion and the intensity V2 of the second portion to the location of detecting light L detection is longer than the distance from the location that is approached or touched corresponding to the smaller one of the intensity V1 of the first portion and the intensity V2 of the second portion to the location of detecting light L detection. In particular, the apparatus used to execute the above steps and the detailed description thereof are as described in the embodiments of FIG. 1 to FIG. 7, and are not repeated herein.

Moreover, the step of determining which one of the intensity V1 of the first portion of the signal and the intensity V2 of the second portion of the signal is larger further includes: increasing, when the difference between the intensity V1 of the first portion and the intensity V2 of the second portion does not exceed the predetermined extent, the length of exposure time of detecting at least one detecting light L such that the difference between the intensity V1 of the first portion and the intensity V2 of the second portion exceeds the predetermined extent. In particular, the apparatus used to execute the above steps and the detailed description thereof are as described in the embodiments of FIG. 1 to FIG. 7, and are not repeated herein.

Moreover, the step (i.e., step S300) of detecting the reflected at least one detecting light L and converting the at least one detecting light L into at least one corresponding signal includes detecting at least one detecting light L at a plurality of different locations of detection beside the base plane SP and respectively converting the at least one detecting light L into a plurality of corresponding signals. Moreover, the step determining the location of the base plane SP that is approached or touched according to the signal corresponding to the detecting light L includes: calculating a plurality of possible locations approached or touched by the first object OB1 and the second object OB2 according to signals respectively corresponding to the locations of detection using triangulation.

More specifically, the step of determining which one of the intensity V1 of the first portion of the signal corresponding to the first object OB1 and the intensity V2 of the second portion of the signal corresponding to the second object OB2 is larger includes: determining which one of the intensity V1 of a first portion of the signal and the intensity V2 of the second portion of the signal is larger, so as to select actual locations that are approached or touched by the first object OB1 and the second object OB2 from the locations corresponding to the intensity V1 of the first portion of the signal and the intensity V2 of the second portion of the signal.

Moreover, the step of determining which one of the intensity V1 of the first portion of the signal corresponding to the first object OB1 and the intensity V2 of the second portion of the signal corresponding to the second object OB2 is larger includes: increasing, when the difference between the intensity V1 and the intensity V2 does not exceed the predetermined extent, the length of exposure time corresponding to at least one of the locations of detection such that the difference between the intensity V1 and the intensity V2 exceeds the predetermined extent.

Moreover, the step of determining which one of the intensity V1 of the first portion of the signal corresponding to the first object OB1 and the intensity of the second portion V2 of the signal corresponding to the second object OB2 is larger includes: calculating the location of geometric center of the possible locations and deciding the length of initial exposure time of detecting at least one detecting light L in at least one of the locations of detection according to the location of geometric center. Moreover, the step of determining which one of the intensity V1 of the first portion of the signal and the intensity V2 of the second portion of the signal is larger includes: finding the length of initial exposure time of detecting at least one detecting light L in at least one of the locations of detection according to the location of geometric center with a table look up method. In particular, the plurality of data in the table searched in the table look up method is data obtained through an experiment or a simulation. Accordingly, when at least one of a first object and a second object approaches or touches a base plane, which one of the intensity of the first portion of the signal and the intensity of the second portion of the signal detected by the optical detecting sensor is larger is determined, and the location of the base plane that is approached or touched is determined. In particular, the apparatus used to execute the above steps and the detailed description thereof are as described in the embodiments of FIG. 1 to FIG. 7, and are not repeated herein.

More specifically, the step of determining which one of the intensity V1 of the first portion of the signal corresponding to the first object OB1 and the intensity of the second portion V2 of the signal corresponding to the second object OB2 is larger includes: returning the exposure time to a default value after determining the actual locations approached or touched by the first object OB1 and the second object OB2.

Moreover, the method of touch detection further includes: determining which one of the distance from the first object OB1 to the location of detecting light L detection and the distance from the second object OB2 to the location of the detecting light L detection by determining which one of the intensity V1 of the first portion of the signal and the intensity V2 of the second portion of the signal is larger.

Figure 9:
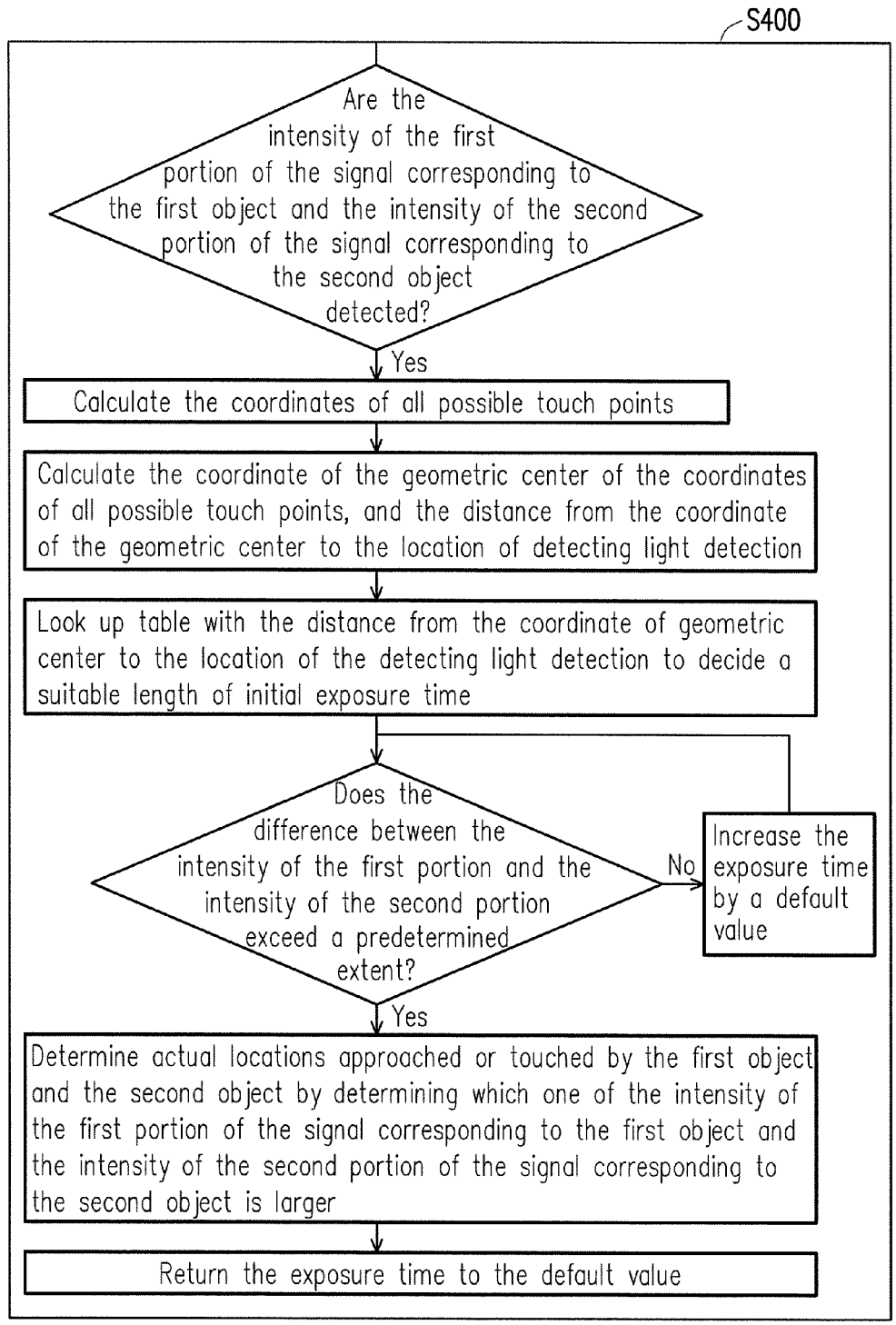
FIG. 9 is a flow chart according to the embodiment of FIG. 8.

FIG. 9 is a flow chart according to the embodiment of FIG. 8. Referring to FIG. 9, in the present embodiment, step S400 can be the process shown in FIG. 9. Specifically, whether the intensity V1 of the first portion of the signal corresponding to the first object OB1 and the intensity V2 of the second portion of the signal corresponding to the second object OB2 are detected is determined. If yes, then a plurality of possible locations approached or touched by the first object OB1 and the second object OB2 is calculated. Next, the coordinate C of geometric center of the coordinates of a plurality of possible locations approached or touched by the first object OB1 and the second object OB2, as well as the distance from the coordinate C of geometric center to the location detecting light L detection are calculated. Moreover, a suitable length of initial exposure time is decided by searching a table with the distance from the coordinate C of geometric center to the location of detecting light L detection. Next, whether the difference between the intensity V1 and the intensity V2 exceeds a predetermined extent is determined. If yes, then the actual locations approached or touched by the first object OB1 and the second object OB2 are determined by determining which one of the intensity V1 of the first portion of the signal corresponding to the first object OB1 and the intensity V2 of the second portion of the signal corresponding to the second object OB2 is larger. If the difference between the intensity V1 and the intensity V2 does not exceed the predetermined extent, then the exposure time is increased by a specific value until the difference between the intensity V1 and the intensity V2 exceeds the predetermined extent. More specifically, when the actual locations approached or touched by the first object OB1 and the second OB2 are obtained, the exposure time is returned to the predetermined extent.

Figure 10:
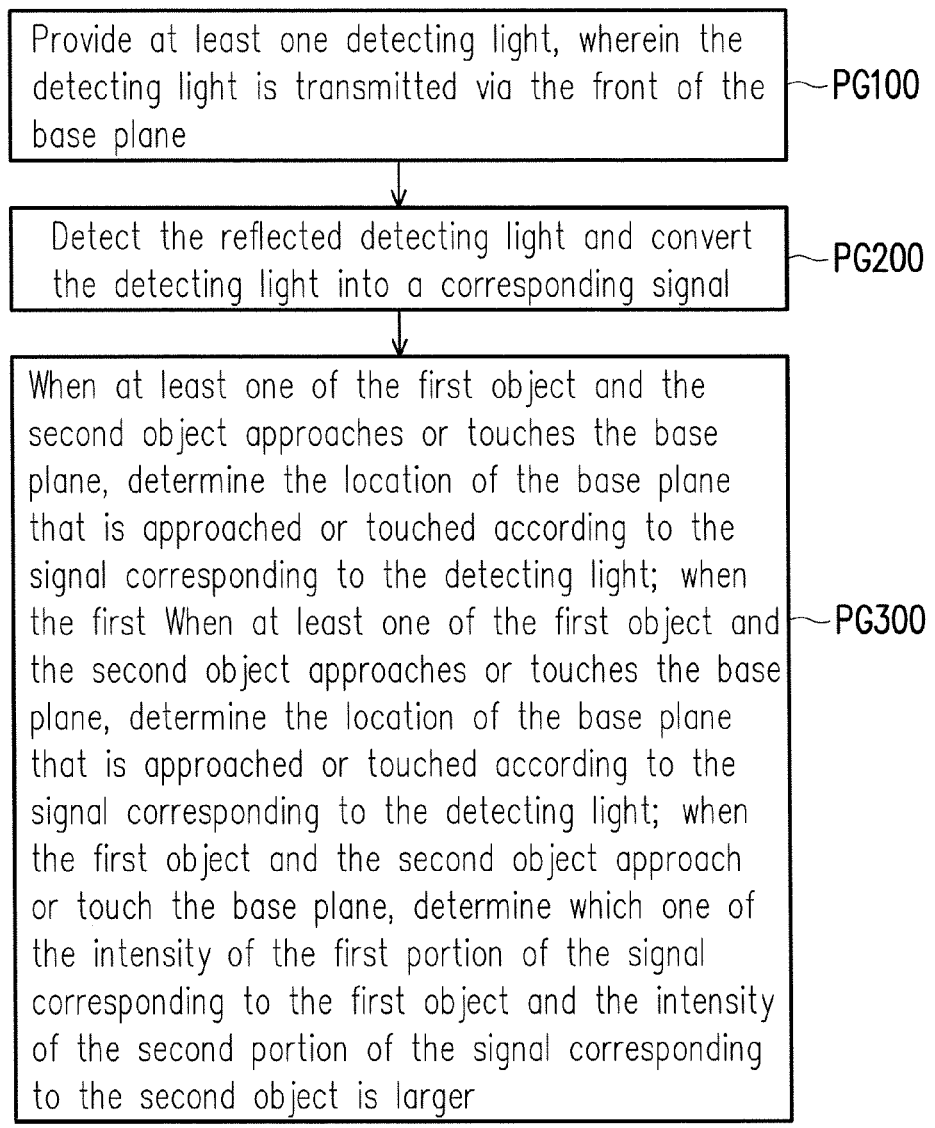
FIG. 10 is a command flow chart of a computer program product according to an embodiment of the disclosure.

FIG. 10 is a command flow chart of a computer program product according to an embodiment of the disclosure. Please refer to FIG. 10. A computer program product is suitable for being stored in a computer-readable recording medium to determine the action of at least one of a first object OB1 and a second object OB2 approaching or touching a base plane SP. In the present embodiment, the computer program product can be loaded in, for instance, the processor 140 of FIG. 1 to execute the following instructions. The computer program product can include: first instructions (PG100) providing at least one detecting light L. In particular, the detecting light L is transmitted via the front of the base plane SP. The computer program product can also include: second instructions (PG200) detecting the reflected detecting light L and converting the detecting light L into a corresponding signal; and third instructions (PG300) determining, when at least one of the first object OB1 and the second object OB2 approaches or touches the base plane SP, the location of the base plane SP that is approached or touched according to the signal corresponding to the detecting light L. The third instructions (PG300) further determine, when the first object OB1 and the second object OB2 approach or touch the base plane SP, which one of the intensity V1 of a first portion of the signal corresponding to the first object OB1 and the intensity V2 of a second portion of the signal corresponding to the second object OB2. Moreover, the instructions included in the computer program product can be executed by the processor 140 in FIG. 1. In particular, the first, second, third, and fourth instructions are only used for identification to describe the present embodiment. The execution sequence of the instructions of the disclosure is not limited thereto. Moreover, the apparatus used to execute the above instructions and the detailed description thereof are as described in the embodiments of FIG. 1 to FIG. 7, and are not repeated herein.

In particular, the fourth instructions can include: instructions determining, when the difference between the intensity V1 and the intensity V2 exceeds a predetermined extent, the distance from the location that is approached or touched corresponding to the larger one of the intensity V1 and the intensity V2 to the location of detecting light L detection is longer than the distance from the location that is approached or touched corresponding to the smaller one of the intensity V1 and the intensity V2 to the location of detecting light L detection. Furthermore, the fourth instructions further include: instructions increasing, when the difference between the intensity V1 and the intensity V2 does not exceed the predetermined extent, the length of exposure time of detecting the at least one detecting light L such that the difference between the intensity V1 and the intensity V2 exceeds the predetermined extent.

More specifically, in the present embodiment, the instructions (i.e., the second instructions (PG200)) detecting the reflected at least one detecting light L and converting the at least one detecting light L into at least one corresponding signal include detecting at least one detecting light L at a plurality of different locations of detection beside the base plane SP and respectively converting the at least one detecting light L into a plurality of corresponding signals. Moreover, the instructions determining the location of the base plane SP that is approached or touched according to the signal corresponding to the detecting light L include: instructions calculating a plurality of possible locations approached or touched by the first object OB1 and the second object OB2 according to signals respectively corresponding to locations of detection using triangulation. In particular, the apparatus used to execute the above instructions and the detailed description thereof are as described in the embodiments of FIG. 1 to FIG. 7, and are not repeated herein.

Specifically, the fourth instructions include: instructions determining which one of the intensity V1 of a first portion of a signal and the intensity V2 of a second portion of the signal is larger, so as to select actual locations approached or touched by the first object OB1 and the second object OB2 from the locations corresponding to the intensity V1 of the first portion of the signal and the intensity V2 of the second portion of the signal. Moreover, the fourth instructions include: instructions increasing, when the difference between the intensity V1 and the intensity V2 does not exceed the predetermined extent, the length of exposure time corresponding to at least one of the locations of detection such that the difference between the intensity V1 and the intensity V2 exceeds the predetermined extent. In particular, the apparatus used to execute the above instructions and the detailed description thereof are as described in the embodiments of FIG. 1 to FIG. 7, and are not repeated herein.

Furthermore, the fourth instructions include: instructions calculating a location of geometric center of the possible locations and deciding a length of initial exposure time of detecting at least one detecting light L in at least one of the locations of detection according to the location of geometric center. Moreover, the fourth instructions include: instructions finding a length of initial exposure time of detecting at least one detecting light L in at least one of the locations of detection according to the location of geometric center with a table look up method. Moreover, the fourth instructions include: instructions returning the exposure time to a default value after determining the actual locations approached or touched by the first object OB1 and the second object OB2. In particular, the apparatus used to execute the above instructions and the detailed description thereof are as described in the embodiments of FIG. 1 to FIG. 7, and are not repeated herein.

Moreover, in the present embodiment, the computer program product can further include: instructions determining which one of the distance from the first object OB1 to the location of detecting light L detection and the distance from the second object OB2 to the location of the detecting light L detection by determining which one of the intensity V1 of the first portion of the signal corresponding to the first object OB1 and the intensity V2 of the second portion of the signal corresponding to the second object OB2.

Based on the above, the optical touch system in the embodiments of the disclosure determines, when at least one of a first object and a second object approaches or touches a base plane, which one of the intensity of a first portion of a signal corresponding to the first object and the intensity of a second portion of the signal corresponding to the second object detected by an optical detecting sensor is larger. Therefore, the location of the base plane that is approached or touched can be accurately determined. The method of touch detection in the embodiments of the disclosure determines, when at least one of a first object and a second object approaches or touches a base plane, which one of the intensity of a first portion of a signal corresponding to the first object and the intensity of a second portion of the signal corresponding to the second object detected is larger. Therefore, the location of the base plane that is approached or touched can be accurately determined. The computer program product in the embodiments of the disclosure determines, when at least one of a first object and a second object approaches or touches a base plane, which one of the intensity of a first portion of a signal corresponding to the first object and the intensity of a second portion of the signal corresponding to the first object detected is larger. Therefore, the location of the base plane that is approached or touched can be accurately determined.

Although the disclosure has been described with reference to the above embodiments, it will be apparent to one of the ordinary skill in the art that modifications to the described embodiments may be made without departing from the spirit of the disclosure. Accordingly, the scope of the disclosure is defined by the attached claims not by the above detailed descriptions.

What is claimed is:

1. An optical touch system for determining an action of at least one of a first object and a second object approaching or touching a base plane, the optical touch system comprising:
    a reflector disposed beside the base plane;
    at least one light source disposed beside the base plane and providing a detecting light, wherein the detecting light is transmitted to the reflector via a front of the base plane;
    at least one optical detecting sensor disposed beside the base plane, wherein the reflector reflects the detecting light and transmits the detecting light to a first optical detecting sensor via the front of the base plane; and
    a processor coupled to the optical detecting sensor, wherein when at least one of the first object and the second object approaches or touches the base plane, the processor determines a location of the base plane that is approached or touched according to a signal corresponding to the detecting light from the optical detecting sensor, and when the first object and the second object approach or touch the base plane, the processor determines which one of an intensity of a first portion of the signal corresponding to the first object and an intensity of a second portion of the signal corresponding to the second object is larger, wherein when a difference between the intensity of the first portion and the intensity of the second portion exceeds a predetermined extent, the processor determines a distance from a location that is approached or touched corresponding to a larger one of the intensity of the first portion and the intensity of the second portion to the optical detecting sensor is longer than a distance from a location that is approached or touched corresponding to a smaller one of the intensity of the first portion and the intensity of the second portion to the optical detecting sensor,
    wherein exceeding the predetermined extent is defined as a difference between a grey value of the intensity of the first portion and a grey value of the intensity of the second portion is larger than 1,
    wherein the at least one optical detecting sensor is a plurality of optical detecting sensors disposed at different locations beside the base plane, and when the first object and the second object approach or touch the base plane, the processor uses a triangulation to calculate a plurality of possible locations approached or touched by the first object and the second object according to the signals of the optical detecting sensors, wherein when the difference between the intensity of the first portion and the intensity of the second portion of each of the optical detecting sensors does not exceed the predetermined extent, the processor increases a length of exposure time of at least one the optical detecting sensors such that the difference between the intensity of the first portion and the intensity of the second portion corresponding to the at least one optical detecting sensor exceeds the predetermined extent, wherein the processor calculates a location of geometric center of the possible locations and decides a length of initial exposure time of at least one of the optical detecting sensors according to the location of geometric center.

2. The optical touch system of claim 1, wherein when the difference between the intensity of the first portion and the intensity of the second portion does not exceed the predetermined extent, the processor increases a length of exposure time of the optical detecting sensor such that the difference between the intensity of the first portion and the intensity of the second portion exceeds the predetermined extent.

3. The optical touch system of claim 1, wherein the processor determines which one of the intensity of the first portion of the signal of at least one of the optical detecting sensors and the intensity of the second portion of the signal is larger, so as to select actual locations approached or touched by the first object and the second object from the possible locations.

4. The optical touch system of claim 1, wherein the processor decides the length of initial exposure time of at least one of the optical detecting sensors according to the location of geometric center through a table look up method.

5. The optical touch system of claim 4, wherein after the processor determines the actual locations approached or touched by the first object and the second object, the processor returns the exposure time of each of the optical detecting sensors to a default value.

6. The optical touch system of claim 1, wherein the processor determines which one of a distance from the first object to the optical detecting sensor and a distance from the second object to the optical detecting sensor is larger by determining which one of the intensity of the first portion of the signal corresponding to the first object and the intensity of the second portion of the signal corresponding to the second object is larger.

7. A method of touch detection for determining an action of at least one of a first object and a second object approaching or touching a base plane, the method comprising:

providing at least one detecting light and transmitting the detecting light via a front of the base plane;

reflecting the detecting light on one side of the base plane;

detecting the reflected at least one detecting light and converting the at least one detecting light into at least one corresponding signal;

determining, when at least one of the first object and the second object approaches or touches the base plane, a location of the base plane that is approached or touched according to the signal corresponding to the detecting light; and determining, when the first object and the second object approach or touch the base plane, which one of an intensity of a first portion of the signal corresponding to the first object and an intensity of a second portion of the signal corresponding to the second object is larger, wherein the step of determining which one of the intensity of the first portion of the signal and the intensity of the second portion of the signal is larger comprises:

determining, when a difference between the intensity of the first portion and the intensity of the second portion exceeds a predetermined extent, a distance from a location that is approached or touched corresponding to a larger one of the intensity of the first portion and the intensity of the second portion to a location of detecting light detection is longer than a distance from a location that is approached or touched corresponding to a smaller one of the intensity of the first portion and the intensity of the second portion to the location of detecting light detection, wherein exceeding the predetermined extent is defined as a difference between a grey value of the intensity of the first portion and a grey value of the intensity of the second portion is larger than 1, wherein the step of detecting the reflected at least one detecting light and converting the at least one detecting light into at least one corresponding signal comprises detecting the at least one detecting light at a plurality of different locations of detection beside the base plane, and respectively converting the at least one detecting light into a plurality of corresponding signals, and the step of determining the location of the base plane that is approached or touched according to the signal corresponding to the detecting light comprises:

using a triangulation to calculate a plurality of possible locations approached or touched by the first object and the second object according to the signals respectively corresponding to the locations of detection, wherein the step of determining which one of the intensity of the first portion of the signal and the intensity of the second portion of the signal is larger comprises:

increasing, when the difference between the intensity of the first portion and the intensity of the second portion corresponding to each of the locations of detection does not exceed the predetermined extent, a length of exposure time corresponding to at least one of the locations of detection such that the difference between the intensity of the first portion and the intensity of the second portion corresponding to the at least one location of detection exceeds the predetermined extent, wherein the step of determining which one of the intensity of the first portion of the signal and the intensity of the second portion of the signal is larger comprises:

calculating a location of geometric center of the possible locations and deciding a length of initial exposure time of detecting the at least one detecting light in at least one of the locations of detection according to the location of geometric center.

8. The method of claim 7, wherein the step of determining which one of the intensity of the first portion of the signal and the intensity of the second portion of the signal is larger further comprises:

increasing, when the difference between the intensity of the first portion and the intensity of the second portion does not exceed the predetermined extent, a length of exposure time of detecting the at least one detecting light such that the difference between the intensity of the first portion and the intensity of the second portion exceeds the predetermined extent.

9. The method of claim 7, wherein the step of determining which one of the intensity of the first portion of the signal and the intensity of the second portion of the signal is larger comprises:

determining which one of the intensity of the first portion of each of the signals and the intensity of the second portion of each of the signals is larger, so as to select actual locations approached or touched by the first object and the second object from the locations corresponding to the intensity of the first portion of each of the signals and the intensity of the second portion of each of the signals.

10. The method of claim 7, wherein the step of determining which one of the intensity of the first portion of the signal and the intensity of the second portion of the signal is larger comprises:
finding the length of initial exposure time of detecting the at least one detecting light in at least one of the locations of detection according to the location of geometric center with a table look up method, wherein a plurality of values in a table searched in the table look up method are data obtained by an experiment or a simulation.

11. The method of claim 10, wherein the step of determining which one of the intensity of the first portion of the signal and the intensity of the second portion of the signal is larger comprises:
returning each of the exposure times to a default value after determining actual locations approached or touched by the first object and the second object.

12. The method of claim 7, further comprising:
determining which one of a distance from the first object to the location of detecting light detection and a distance from the second object to the location of the detecting light detection is larger by determining which one of the intensity of the first portion of the signal corresponding to the first object and the intensity of the second portion of the signal corresponding to the second object is larger.

13. A computer program product in a non-transitory computer readable medium for determining an action of at least one of a first object and a second object approaching or touching a base plane, the computer program product comprising:
first instructions for providing at least one detecting light, wherein the detecting light is transmitted via a front of the base plane;
second instructions for detecting the reflected detecting light and converting the detecting light into a corresponding signal;
third instructions for determining, when at least one of the first object and the second object approaches or touches the base plane, a location of the base plane that is approached or touched according to the signal corresponding to the detecting light; and
fourth instructions for determining, when the first object and the second object approach or touch the base plane, which one of an intensity of a first portion of the signal according to the first object and an intensity of a second portion of the signal according to the second object is larger, wherein the fourth instructions comprise:
instructions for determining, when a difference between the intensity of the first portion and the intensity of the second portion exceeds a predetermined extent, a distance from the location that is approached or touched corresponding to a larger one of the intensity of the first portion and the intensity of the second portion to a location of detecting light detection is longer than a distance from a location that is approached or touched corresponding to a smaller one of the intensity of the first portion and the intensity of the second portion to the location of detecting light detection,
wherein exceeding the predetermined extent is defined as a difference between a grey value of the intensity of the first portion and a grey value of the intensity of the second portion is larger than 1,
wherein the second instructions are instructions for detecting the at least one detecting light at a plurality of different locations of detection beside the base plane, and respectively converts the at least one detecting light into a plurality of corresponding signals, and the instructions for determining the location of the base plane that is approached or touched according to the signal corresponding to the detecting light comprise:
instructions for using a triangulation to calculate a plurality of possible locations approached or touched by the first object and the second object according to the signals respectively corresponding to the locations of detection,
wherein the second instructions are instructions for detecting the at least one detecting light at a plurality of different locations of detection beside the base plane, and respectively converts the at least one detecting light into a plurality of corresponding signals, and the instructions for determining the location of the base plane that is approached or touched according to the signal corresponding to the detecting light comprise:
instructions for using a triangulation to calculate a plurality of possible locations approached or touched by the first object and the second object according to the signals respectively corresponding to the locations of detection,
wherein the fourth instructions comprise:
instructions for calculating a location of geometric center of the possible locations and deciding a length of initial exposure time of detecting the at least one detecting light in at least one of the locations of detection according to the location of geometric center.

14. The computer program product of claim 13, wherein the fourth instructions further comprise:
instructions for increasing, when the difference between the intensity of the first portion and the intensity of the second portion does not exceed the predetermined extent, a length of exposure time of detecting the at least one detecting light such that the difference between the intensity of the first portion and the intensity of the second portion exceeds the predetermined extent.

15. The computer program product of claim 13, wherein the fourth instructions comprise:
instructions for determining which one of the intensity of the first portion of each of the signals and the intensity of the second portion of each of the signals is larger, so as to select actual locations approached or touched by the first object and the second object from the locations corresponding to the intensity of the first portion of each of the signals and the intensity of the second portion of each of the signals.

16. The computer program product of claim 13, wherein the fourth instructions comprise:
instructions for finding the length of initial exposure time of detecting the at least one detecting light in at least one of the locations of detection according to the location of geometric center with a table look up method.

17. The computer program product of claim 16, wherein the fourth instructions comprise:

instructions for returning each of the exposure times to a default value after determining actual locations approached or touched by the first object and the second object.

18. The computer program product of claim 13, further comprising: instructions for determining which one of a distance from the first object to the location of detecting light detection and a distance from the second object to the location of the detecting light detection is larger by determining which one of the intensity of the first portion of the signal corresponding to the first object and the intensity of the second portion of the signal corresponding to the second object is larger.

* * * * *